United States Patent
Choi et al.

(10) Patent No.: US 10,516,512 B2
(45) Date of Patent: Dec. 24, 2019

(54) METHOD AND APPARATUS FOR CONFIGURING CONTROL INFORMATION INDICATING RESOURCE UNIT IN WIRELESS LOCAL AREA NETWORK SYSTEM

(71) Applicant: LG ELECTRONICS INC., Seoul (KR)

(72) Inventors: Jinsoo Choi, Seoul (KR); Dongguk Lim, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 15/367,084

(22) Filed: Dec. 1, 2016

(65) Prior Publication Data

US 2017/0163394 A1 Jun. 8, 2017

Related U.S. Application Data

(60) Provisional application No. 62/286,447, filed on Jan. 25, 2016, provisional application No. 62/269,098, (Continued)

(51) Int. Cl.
*H04L 5/00* (2006.01)
*H04W 84/12* (2009.01)

(52) U.S. Cl.
CPC .......... *H04L 5/0048* (2013.01); *H04L 5/0037* (2013.01); *H04L 5/0053* (2013.01); *H04L 5/0007* (2013.01); *H04W 84/12* (2013.01)

(58) Field of Classification Search
None
See application file for complete search history.

(56) References Cited

U.S. PATENT DOCUMENTS

2016/0105304 A1* 4/2016 Kwon ................. H04L 27/2665
370/338
2017/0064718 A1* 3/2017 Bharadwaj ........ H04W 72/0493
(Continued)

OTHER PUBLICATIONS

Korean Intellectual Property Office Application No. 10-2016-0159471, Office Action dated Jul. 16, 2018, 6 pages.
(Continued)

*Primary Examiner* — Robert M Morlan
(74) *Attorney, Agent, or Firm* — Lee Hong Degerman Kang Waimey

(57) ABSTRACT

The present specification proposes a method of configuring and transmitting a PHY protocol data unit (PPDU) including first to fourth resource unit (RU) areas corresponding to at least first to fourth frequency bands. The first frequency band corresponds to a lowest frequency band, and the fourth frequency band corresponds to a highest frequency band. In the PPDU, a center RU area is arranged between the second RU area and the third RU area. In this case, the PPDU includes a second signal field corresponding to the second frequency band and a third signal field corresponding to the third frequency band. The second signal field may include a control field for the center RU area, and control information for a user allocated to the center RU area may be included a last field of a user-specific control field of the third signal field.

15 Claims, 14 Drawing Sheets

Related U.S. Application Data filed on Dec. 18, 2015, provisional application No. 62/264,854, filed on Dec. 8, 2015, provisional application No. 62/264,330, filed on Dec. 8, 2015, provisional application No. 62/261,868, filed on Dec. 2, 2015.

(56) References Cited

U.S. PATENT DOCUMENTS

| | | | |
|---|---|---|---|
| 2017/0201981 A1* | 7/2017 | Huang | H04W 74/0816 |
| 2018/0205520 A1* | 7/2018 | Lin | H04L 5/00 |

OTHER PUBLICATIONS

Moon, S. et al., "Supported Resource Allocations in SIG-B", doc.: IEEE 802.11-15/1304r1, Nov. 2015, 15 pages.

Josiam, K. et al., "HE-SIG-B Mapping and Compression", doc.: IEEE 802.11-15/1315r1, Nov. 2015, 19 pages.

* cited by examiner

FIG. 1
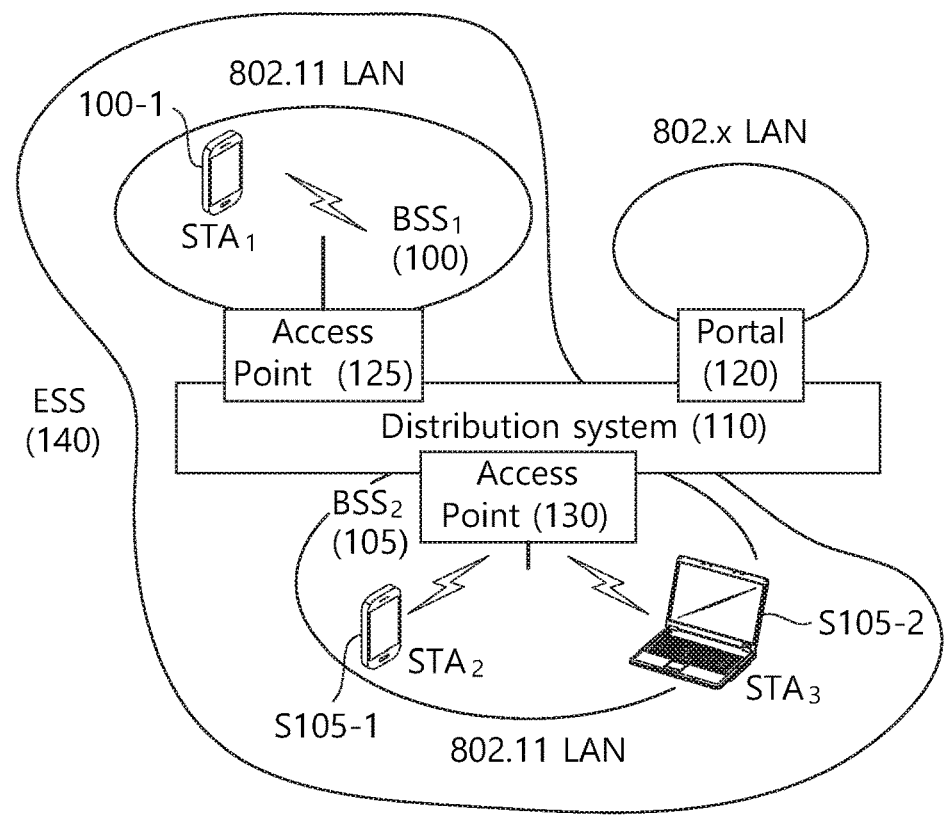
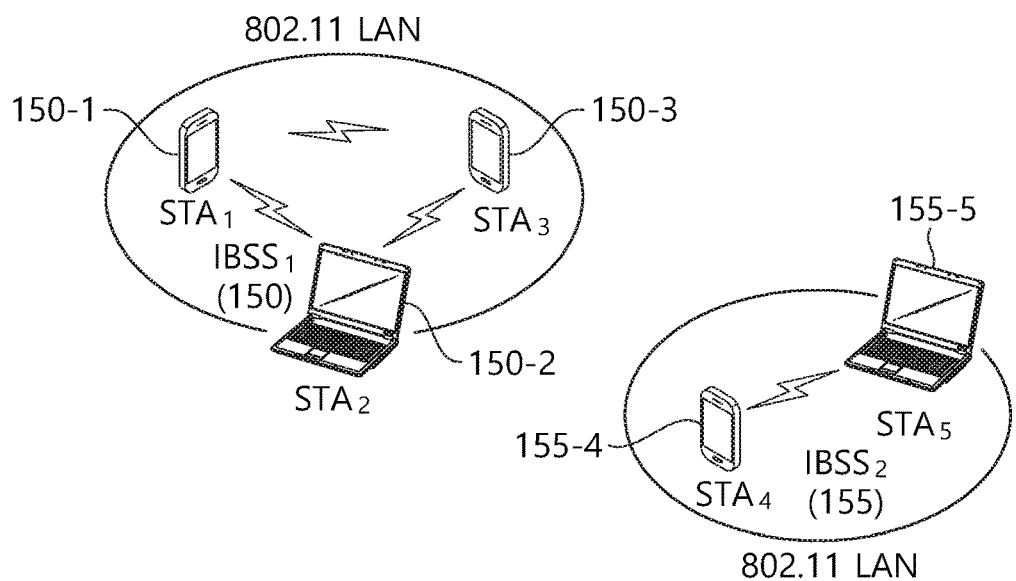

METHOD AND APPARATUS FOR CONFIGURING CONTROL INFORMATION INDICATING RESOURCE UNIT IN WIRELESS LOCAL AREA NETWORK SYSTEM

CROSS-REFERENCE TO RELATED APPLICATIONS

Pursuant to 35 U.S.C. § 119(e), this application claims the benefit of U.S. Provisional Patent Application Nos. 62/261,868, filed on Dec. 2, 2015, 62/264,330, filed on Dec. 8, 2015, 62/264,854, filed on Dec. 8, 2015, 62/269,098, filed on Dec. 18, 2015, and 62/286,447, filed on Jan. 25, 2016, the contents of which are all hereby incorporated by reference herein in their entirety.

BACKGROUND

1. Technical Field

The present specification relates to a scheme of transmitting and receiving data in wireless communication, and more particularly, to a method and apparatus for configuring control information indicating a resource unit supported in a wireless local area network (LAN) system.

2. Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present specification proposes a control field including information for a resource unit in a wireless local area network (LAN) system.

More particularly, the present specification proposes a signaling scheme regarding various types of resource units transmitted at an 80 MHz band.

The present specification proposes a method of configuring and transmitting a PHY protocol data unit (PPDU) including first to fourth resource unit (RU) areas corresponding to at least first to fourth frequency bands. In the PPDU, a center RU area is arranged between the second RU area and the third RU area. In this case, the PPDU includes a second signal field corresponding to the second frequency band and a third signal field corresponding to the third frequency band. The first frequency band may correspond to a lowest frequency band with respect to a frequency index, and the fourth frequency band may correspond to a highest frequency band with respect to the frequency index.

The second signal field includes a second common control field indicating allocation information for at least one RU allocated to the second frequency band, and indicating at least one user allocated to the second frequency band.

In addition, the third signal field includes a third common control field indicating allocation information for at least one RU allocated to the third frequency band and a third user-specific control field indicating at least one user allocated to the third frequency band, and a last user-specific field of the third user-specific control field is used for a user allocated to the center frequency band.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
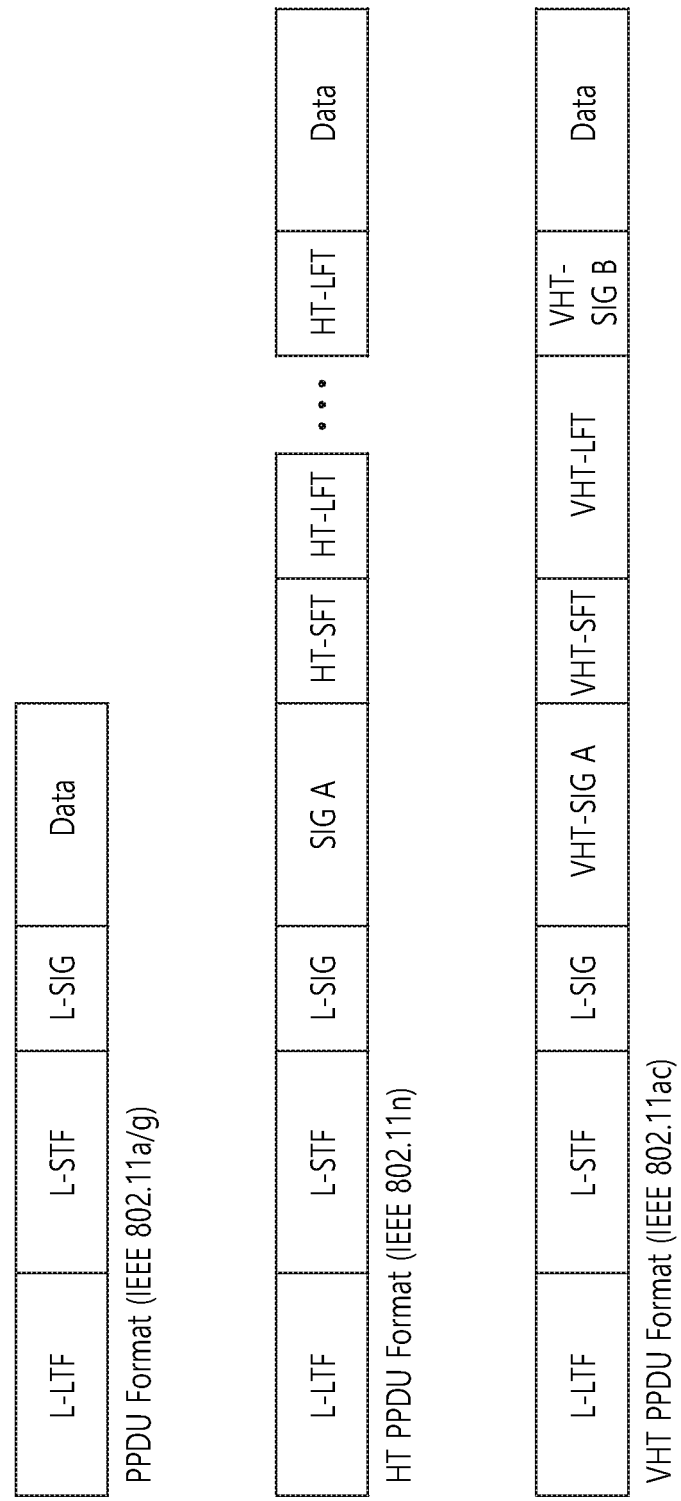
FIG. 2 is a diagram illustrating an example of a PHY protocol data unit (PPDU) used in an institute of electronic and electronics engineers (IEEE) standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
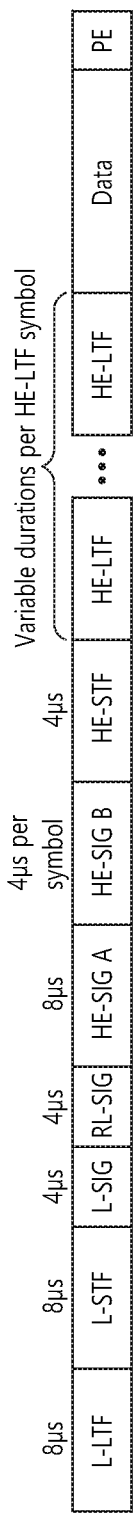
FIG. 3 is a diagram illustrating an example of a high efficiency (HE) PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
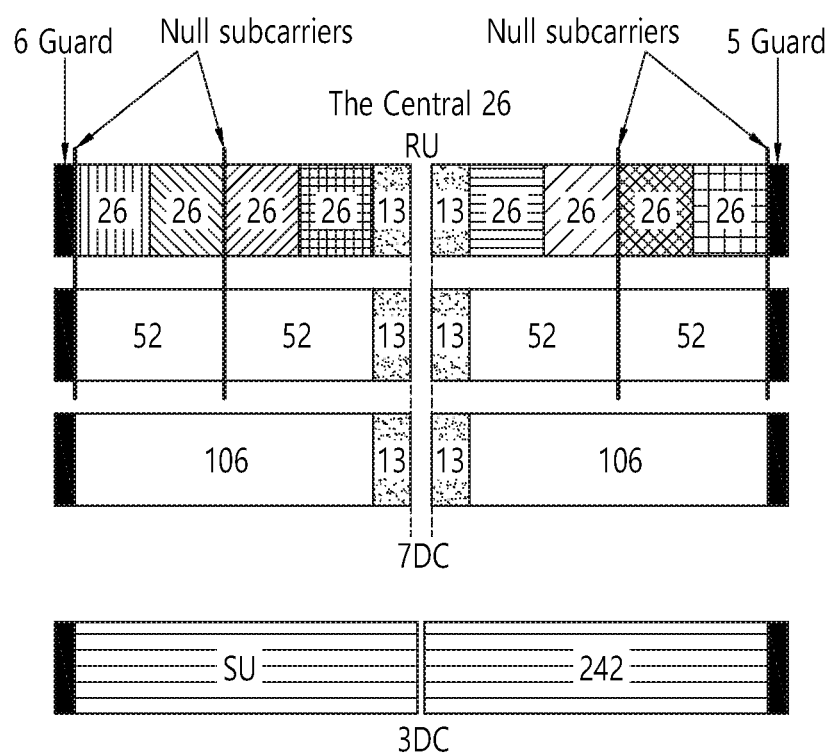
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
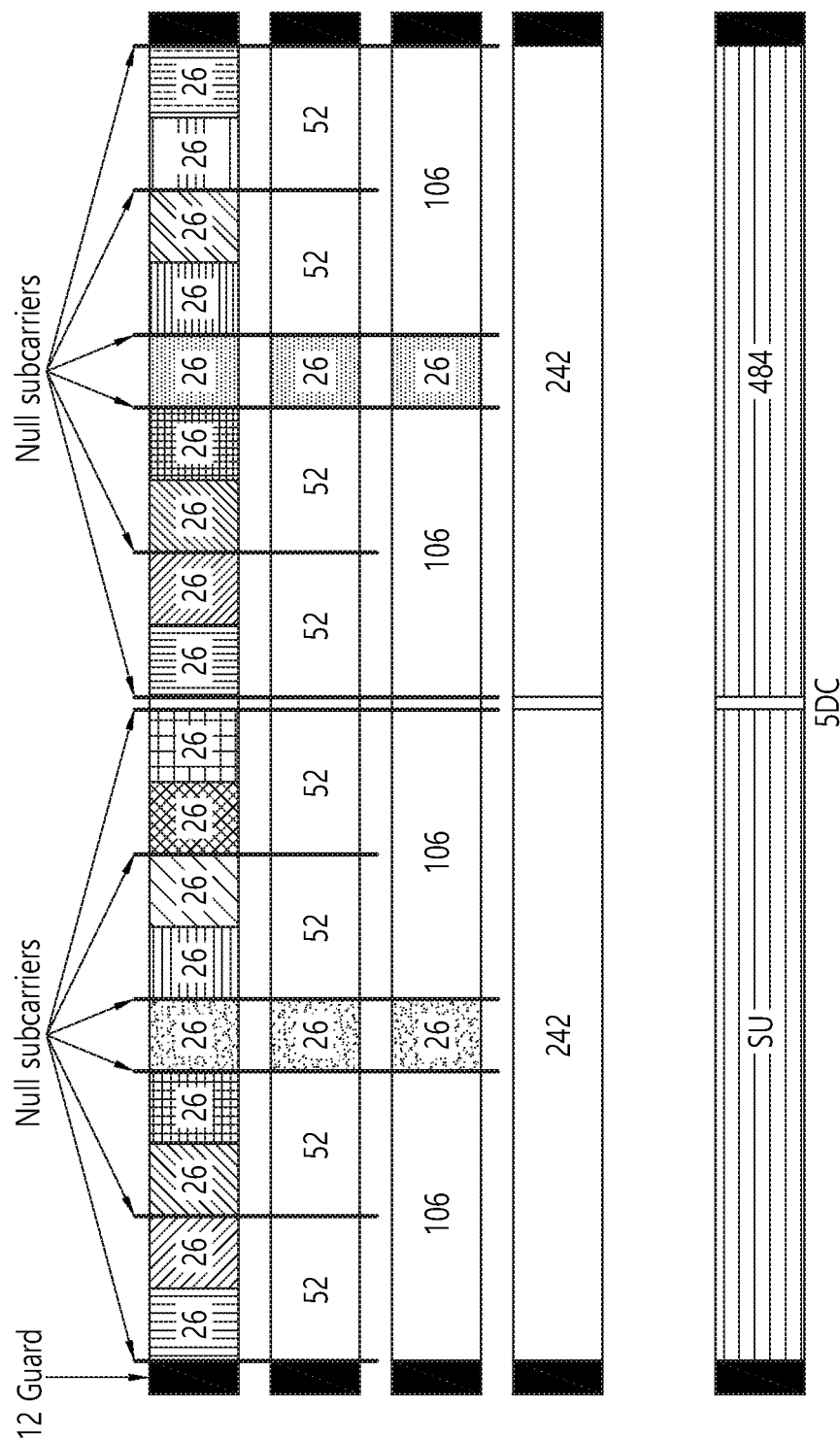
FIG. 5 is a diagram illustrating a layout of RUs used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
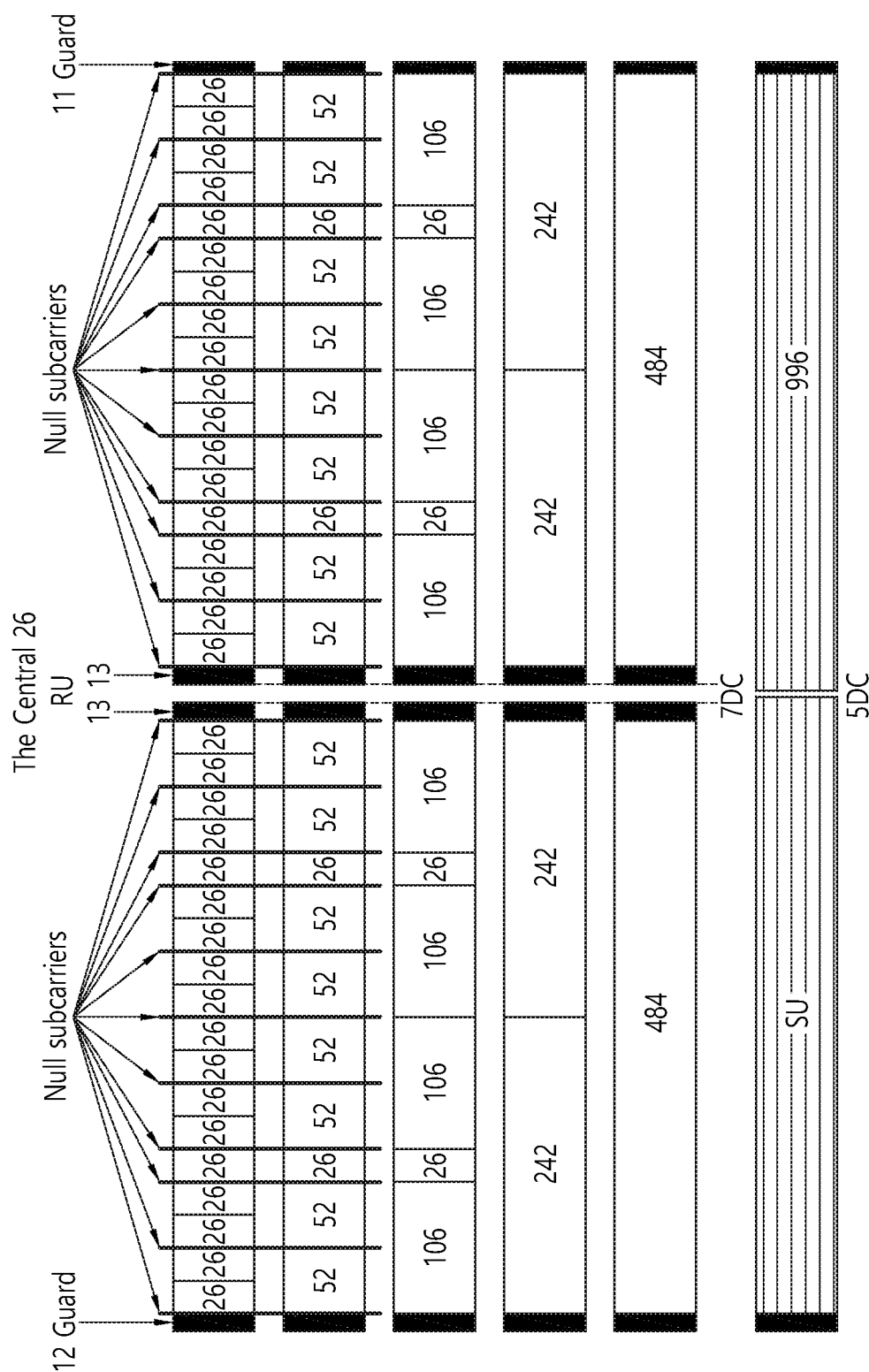
FIG. 6 is a diagram illustrating a layout of RUs used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Meanwhile, the detailed number of RUs may be modified similarly to one example of each of FIG. 4 or 5.

Figure 7:
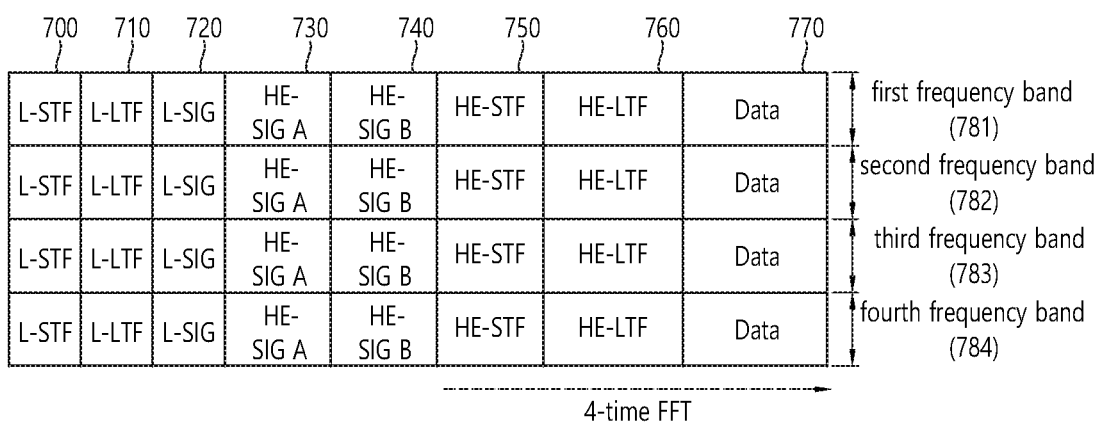
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
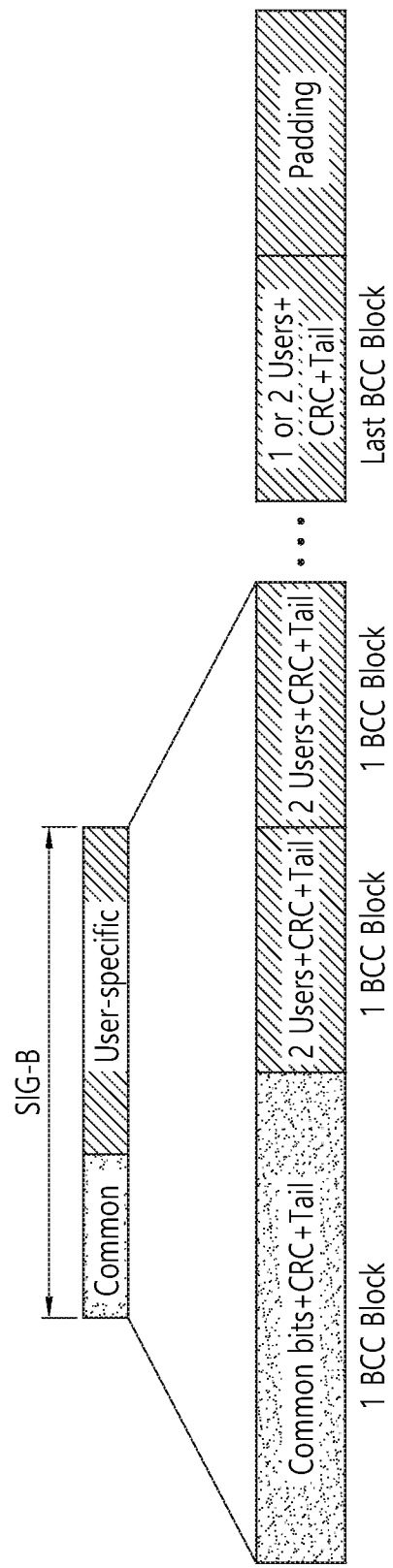
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
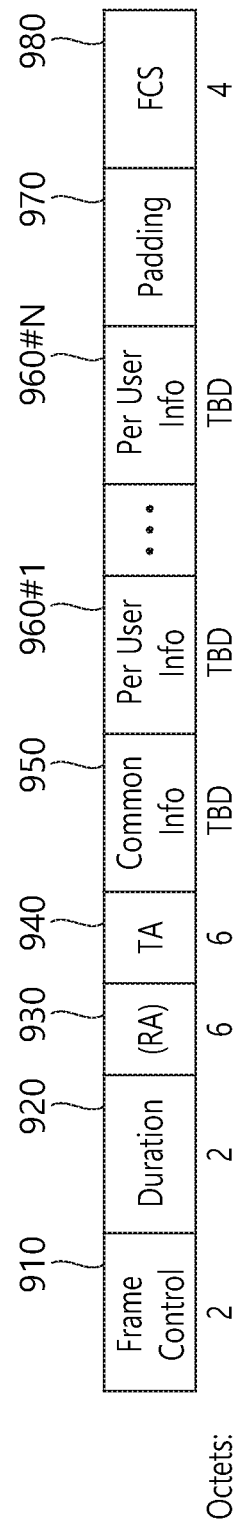
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame. For example, information for controlling the content of a field indicating a length of an L-SIG field of an uplink PPDU transmitted in response to the trigger frame or an SIG-A (i.e., HE SIG-A field) of the uplink PPDU transmitted in response to the trigger frame may be included. Further, information regarding a length of a CP of the uplink PPDU transmitted in response to the trigger frame or information regarding a length of an LTF field may be included as common control information.

In addition, per user information fields 960#1 to 960#N corresponding to the number of receiving STAs for receiving the trigger frame of FIG. 9 are preferably included. The per user information field may be called an "RU allocation field".

In addition, the trigger frame of FIG. 9 may include a padding field 970 and a frame check sequence field 980.

Each of the per user information fields 960#1 to 960#N shown in FIG. 9 preferably includes a plurality of sub-fields.

Figure 10:
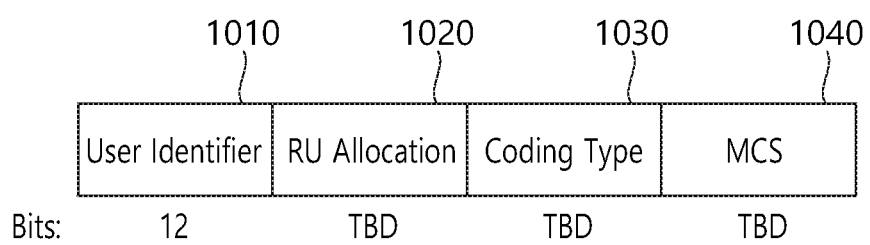
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

A user identifier field 1010 of FIG. 10 indicates an identifier of an STA (i.e., a receiving STA) corresponding to per user information. An example of the identifier may be all or some parts of an AID.

In addition, an RU allocation field 1020 may be included. That is, if a receiving STA identified by the user identifier field 1010 transmits an uplink PPDU in response to the trigger frame of FIG. 9, the uplink PPDU is transmitted through an RU indicated by the RU allocation field 1020. In this case, the RU indicated by the RU allocation field 1020 preferably indicates the RU shown in FIG. 4, FIG. 5, and FIG. 6. A configuration of the RU allocation field 1020 is described below in detail.

The sub-field of FIG. 10 may include a coding type field 1030. The coding type field 1030 may indicate a coding type of an uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

In addition, the sub-field of FIG. 10 may include an MCS field 1040. The MCS field 1040 may indicate an MCS scheme applied to the uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

Hereinafter, the present specification proposes an example of configuring control information for a resource unit (RU). For example, the RU may include a center 26-RU corresponding to a center frequency. The center 26-RU may consist of 13 subcarriers located at both sides of a DC subcarrier shown in FIG. 4 to FIG. 6.

Figure 11:
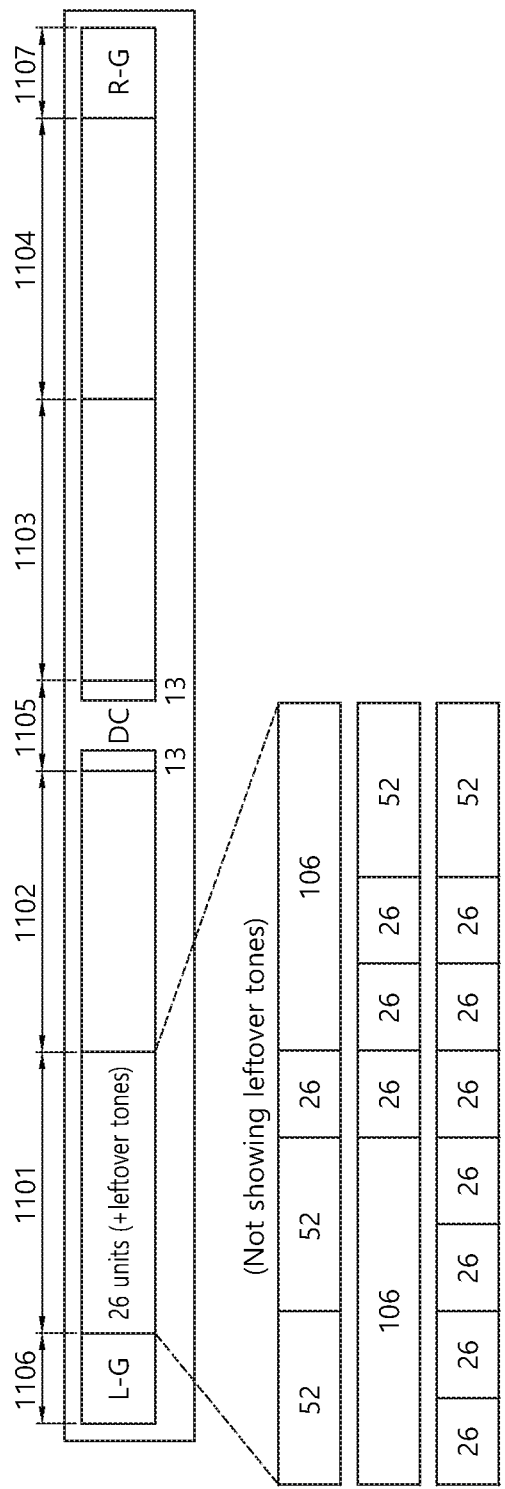
FIG. 11 illustrates an RU arrangement on an 80 MHz band.

FIG. 11 illustrates an RU arrangement on an 80 MHz band. An example of FIG. 11 is a block diagram in which the example of FIG. 6 is simplified. As shown in FIG. 11 or FIG. 6, the 80 MHz band may be divided into a plurality of frequency bands. More particularly, as shown in FIG. 11, a left-guard band 1106 may exist to the left of the 80 MHz band, and a right-guard band 1107 may exist to the right of the 80 MHz band. Similarly to the example of FIG. 6, the left-guard band may be 12 subcarriers, and the right-guard band may be 11 subcarriers.

Meanwhile, as shown in FIG. 11, the 80 MHz band may include a $1^{st}$ frequency band 1101, a $2^{nd}$ frequency band 1102, a $3^{rd}$ frequency band 1103, and a $4^{th}$ frequency band 1104, and may include a center frequency band 1105 between the $2^{nd}$ frequency band 1102 and the $3^{rd}$ frequency band 1104. Further, each of the $1^{st}$ to $4^{th}$ frequency bands 1101, 1102, 1103, and 1104 correspond to one 242-RU shown in FIG. 6. Meanwhile, the center frequency band 1105 includes seven DC carriers and one center 26-RU.

As shown in FIG. 11, at least one RU may be allocated in each frequency band (e.g., the $1^{st}$ frequency band). That is, as shown in FIG. 11, two 52-RUs, one 26-RU, and one 106-RU may be arranged. Further as shown in FIG. 11, one 106-RU, three 26-RUs, and one 52-RU may be arranged. Further, as shown in FIG. 11, seven 26-RUs and one 52-RU may be arranged.

Although a null subcarrier is not shown in FIG. 11, a null subcarrier of FIG. 6 may be inserted. Considering up to the null subcarrier, the $1^{st}$ frequency band 1101 may be displayed as an area of [−500:−259] with respect to a frequency index, the $2^{nd}$ frequency band 1102 may be displayed as an area of [−258:−17] with respect to the frequency index, the $3^{rd}$ frequency band 1103 may be displayed as an area of [17:258] with respect to the frequency index, the $4^{th}$ frequency band 1104 may be displayed as an area [259:500] with respect to the frequency index, and the center frequency band may be displayed as an area of [−16:16] with respect to the frequency index. Although the center frequency band may be displayed as an area of [−16:−4, 4:16] except for a DC subcarrier, for convenience of explanation, it is displayed hereinafter as an area including seven DC subcarriers.

Since a plurality of RUs may be allocated or one RU may be allocated to the $1^{st}$ to $4^{th}$ frequency bands 1101, 1102, 1103, and 1104, allocation information must be indicated regarding which RU is allocated and at which location it is allocated at each frequency band. Such allocation information is preferably included in a common field (or a common control field) of the SIG-B of FIG. 8.

More specifically, which RU is allocated and at which location it is allocated at each frequency band may be indicated according to bitmap information consisting of n bits. For example, an 8-bit index may indicate RU allocation information of the $1^{st}$ frequency band 1101. For example, an index '0000 0000' may indicate that nine 26-RUs are allocated on the $1^{st}$ frequency band 1101, and an index '0000 0001' may indicate that seven 26-RUs and one 52-RU are used on the $1^{st}$ frequency band 1101 and the 52-RU is allocated to the rightmost portion of the $1^{st}$ frequency band 1101. If a mapping relation between various index values and the RU arrangement are defined in this manner, RU allocation information of the $1^{st}$ frequency band 1101 may be indicated through an 8-bit index (or bitmap).

The 8-bit index may be used for each of the $1^{st}$ to $4^{th}$ frequency bands 1101, 1102, 1103, and 1104. That is, RU allocation information for the $1^{st}$ to $4^{th}$ frequency bands 1101, 1102, 1103, and 1104 may be indicated through 32-bit information.

The aforementioned RU allocation information indicates only a type and location of an RU to be arranged, and does not include information regarding which user STA is allocated and to which RU it is allocated. The information regarding which user STA is allocated and to which RU it is allocated may be included in a user-specific field or user-specific control field of the SIG-B of FIG. 8. As shown in FIG. 8, the user specific control field may include at least one BCC block, and one BCC block may include identification information for two users. For example, if user identification information (e.g., AID) is indicated through a $1^{st}$ BCC block, it may be indicated that a corresponding user is allocated to a $1^{st}$ RU (e.g., the leftmost RU) indicated through the RU allocation information.

That is, each STA may acquire allocation information for an RU through four 8-bit indices included in a common field (or common control field) of the SIG-B of FIG. 8, and may confirm to which RU it is allocated through the user-specific field (or user-specific control field) of the SIG-B of FIG. 8.

However, even if the aforementioned signaling scheme is used, information regarding whether a center 26-RU is allocated and which user STA is allocated to a corresponding 26-RU is not indicated. Accordingly, an example described below proposes an improved signaling scheme for the center 26-RU.

For example, control information for the center 26-RU may be included in a last field of the user-specific control field of the SIG-B for the $2^{nd}$ frequency band 1102 and/or the $3^{rd}$ frequency band 1103. That is, control information for the center 26-RU is preferably included in a last BCC block of FIG. 8. In this case, the control information for the 26-RU may include identification information of a user STA allocated to the 26-RU.

Hereinafter, a method of configuring an SIG-B is described in greater detail.

Figure 12:
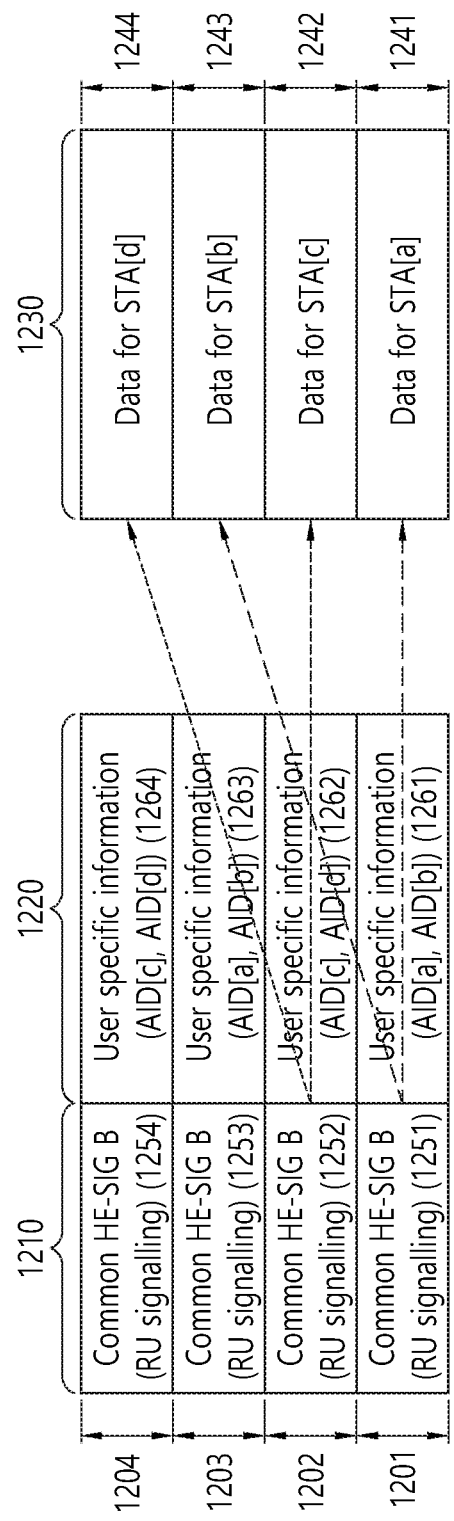
FIG. 12 illustrates a scheme of configuring an SIG-B included in a PPDU of an 80 MHz band.

FIG. 12 illustrates a scheme of configuring an SIG-B included in a PPDU of an 80 MHz band.

In an example of FIG. 12, an SIG-B field includes a common control field 1210 and a user-specific control field 1220. The example of FIG. 12 includes a data field 1230 transmitted through four different frequency bands. The data field of FIG. 12 may correspond to the data field 770 of FIG. 7, and the SIG-B fields 1210 and 1220 of FIG. 12 may correspond to the HE SIG-B 740 of FIG. 7.

In the example of FIG. 12, the SIG-B fields 1210 and 1220 may be transmitted through four SIG-B channels 1201, 1202, 1203, and 1204, and may be duplicated according to a method described below. Further, the data field 1230 may be transmitted through four frequency bands 1241, 1242, 1243, and 1244. In this case, the four frequency bands 1241, 1242, 1243, and 1244 of FIG. 12 may be identical to four frequency bands 1101, 1102, 1103, and 1104 of FIG. 11. In FIG. 12, a center frequency band is omitted for convenience of explanation.

The SIG-B field transmitted through the fourth SIG-B channels 1201, 1202, 1203, and 1204 may be called four signal fields (i.e., 1st to 4th signal fields). That is, the SIG-B field transmitted through the 1st SIG-B channel 1201 may be called a 1st signal field. In this case, the 1st signal field may include a 1st common control field 1251 indicating RU allocation information for at least one RU allocated to the 1st frequency band 1241 and indicating RU allocation information for at least one RU allocated to the 3rd frequency band 1243. Further, the 1st signal field may include a 1st user-specific control field 1261 indicating a user (i.e., STA[a]) allocated to an RU of the 1st frequency band 1241 and indicating a user (i.e., STA[b]) allocated to an RU of the 3rd frequency band 1243.

The 1st common control field 1251 and the 1st user-specific control field 1261 may be duplicated on the 3rd SIG-B channel 1203. That is, the 3rd common control field 1253 and the 3rd user-specific control field 1263 may include the same content as the 1st common control field 1251 and the 1st user-specific control field 1261.

Further, the 2nd signal field may include a 2nd common control field 1252 indicating RU allocation information for at least one RU allocated to the 2nd frequency band 1242 and indicating RU allocation information for at least one RU allocated to the 4th frequency band 1244. Further, the 2nd signal field may include a 2nd user-specific control field 1262 indicating a user (i.e., STA[c]) allocated to an RU of the 2nd frequency band 1242 and indicating a user (i.e., STA[d]) allocated to an RU of the 4th frequency band 1244.

The 2nd common control field 1252 and the 2nd user-specific control field 1262 may be duplicated on the 4th SIG-B channel 1204. That is, the 4th common control field 1254 and the 4th user-specific control field 1264 may include the same content as the 2nd common control field 1252 and the 2nd user-specific control field 1262.

Figure 13:
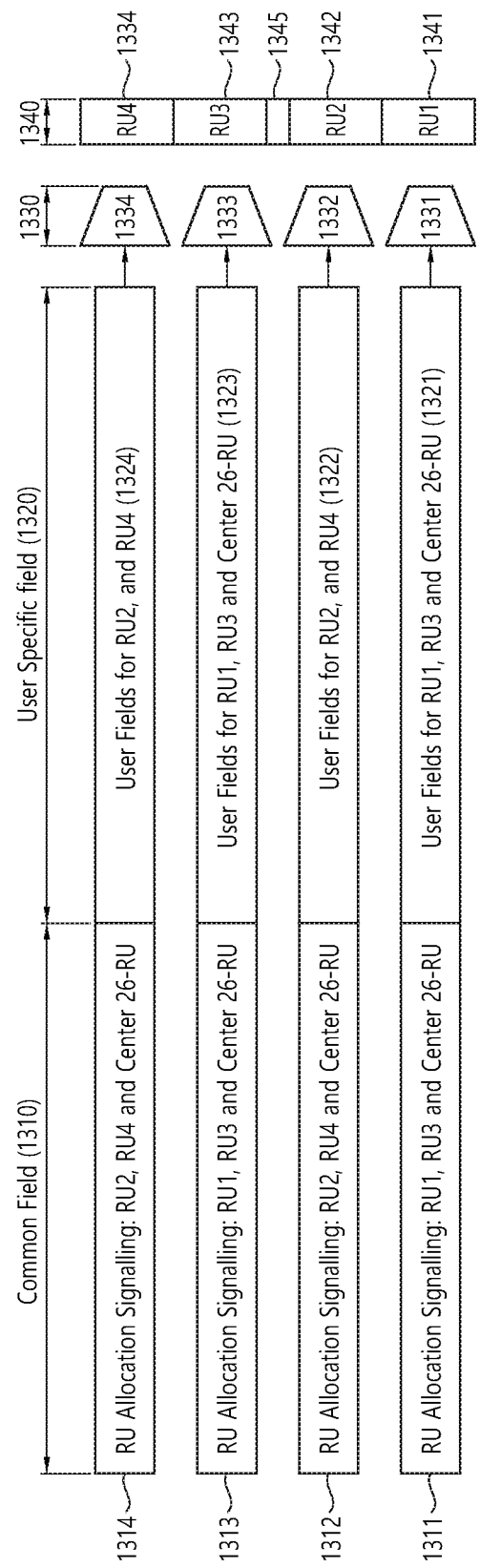
FIG. 13 illustrates a scheme of configuring an SIG-B by considering a center frequency band at an 80 MHz band.

FIG. 13 illustrates a scheme of configuring an SIG-B by considering a center frequency band at an 80 MHz band.

In an example of FIG. 13, an SIG-B field 1330 includes a common control field 1310 and a user-specific control field 1320. The example of FIG. 13 includes a data field 1340 transmitted through four different frequency bands. Meanwhile, in the example of FIG. 13, an arrangement of an RU applied to the data field 1340 may also be equally applied to an HE-LTF or HE-STF signal. The data field 1340 of FIG. 13 may correspond to the data field 770 of FIG. 7, and the SIG-B field 1330 of FIG. 13 may correspond to the HE SIG-B 740 of FIG. 7.

In the example of FIG. 13, the SIG-B field 1330 may be transmitted through four different frequency bands, and each frequency band may correspond to a 20 MHz band. The SIG-B field 1330 of FIG. 13 is used to indicate the data field 1340, and the data field 1340 includes a 1st RU area 1341, a 2nd RU area 1342, a 3rd RU area 1343, a 4th RU area 1344, and a center RU area 1345.

The data field 1340 of FIG. 13 may correspond to the data field 1230 of FIG. 12 or the frequency bands 1101, 1102, 1103, 1104, and 1105 of FIG. 11. That is, the 1st RU area 1341 may correspond to the 1st frequency band 1101 of FIG. 11, and may be displayed as an area of [−500:−259] with respect to a frequency index. Further, the 2nd RU area 1342 may correspond to the 2nd frequency band 1102 of FIG. 11, and may be displayed as an area of [−258:−17] with respect to the frequency index. Further, the 3rd RU area 1343 may correspond to the 3rd frequency band 1130 of FIG. 11, and may be displayed as an area of [17:258] with respect to the frequency index. Further, the 4th RU area 1344 may correspond to the 4th frequency band 1104 of FIG. 11, and may be displayed as an area of [259:500] with respect to the frequency index. Further, the center RU area 1345 may correspond to the center frequency band 1105 of FIG. 11, and may be displayed as an area of [−16:16] with respect to the frequency index. As described above, although the center frequency band may be displayed as an area of [−16:−4, 4:16] except for a DC subcarrier, for convenience of explanation, it is displayed hereinafter as an area including seven DC subcarriers.

For convenience of explanation, the SIG-B field 1330 may be divided into four fields according to a frequency band for transmission. Hereinafter, respective SIG-B fields indicate 1st to 4th signal fields 1331, 1332, 1333, and 1334.

The 1st signal field 1331 includes a 1st common control field 1311 and a 1st user-specific control field 1321. The 1st common control field 1311 preferably includes RU allocation information/signaling for the 1st RU area 1341 and the 3rd RU area 1343. Further, the 1st common control field 1311 may include an identifier (e.g., a 1-bit identifier) indicating whether a 26-RU is allocated to the center RU area 1345.

Further, the 1st user-specific control field 1321 preferably includes user identification information indicating a user allocated to the 1st RU area 1341 and the 3rd RU area 1343. Further, the 1st user-specific control field 1321 may include user identification information indicating a user allocated to a center 26-RU of the center RU area 1345. A control field for the center 26-RU is preferably a last field in the 1st user-specific control field 1321. For example, the control field for the center 26-RU is preferably included in a last BCC block of FIG. 8.

The 1st signal field 1331 may be duplicated to be used as the 3rd signal field 1333. That is, the 1st signal field 1331 and the 3rd signal field 1333 may include the same content.

The 2nd signal field 1332 includes a 2nd common control field 1312 and a 2nd user-specific control field 1322. The 2nd common control field 1312 preferably includes RU allocation information/signaling for the 2nd RU area 1342 and the 4th RU area 1344. Further, the 2nd common control field 1312 may include an identifier (e.g., a 1-bit identifier) indicating whether a 26-RU is allocated to the center RU area 1345. In this case, an identifier for a center 26-RU included in the 1st common control field 1311 and an identifier for a center 26-RU included in the 2nd common control field 1312 may be determined to the same value.

Further, the 2nd user-specific control field 1322 preferably includes user identification information indicating a user allocated to the 2nd RU area 1342 and the 4th RU area 1344. However, the 2nd user-specific control field 1322 may not include user identification information indicating a user allocated to a center 26-RU of the center RU area 1345. That is, a control field for the center 26-RU may be omitted in the 2nd user-specific control field 1322. Since the user identification information for the center 26-RU is already included in the 1st user-specific control field 1321, if control information for the center 26-RU is added to the 2nd user-specific control field 1322, the 2nd user-specific control field 1322 may be increased unnecessarily, and thus information for the center 26-RU may be omitted. As a result, as shown in FIG. 13, the 1st to 4th common control fields 1311, 1312, 1313, and 1314 have the same length, and the 1st user-specific control field 1321 and the 2nd user-specific control field 1322 may have different lengths.

The 2nd signal field 1332 may be duplicated to be used as the 4th signal field 1334. That is, the 2nd signal field 1332 and the 4th signal field 1334 may include the same content.

Figure 14:
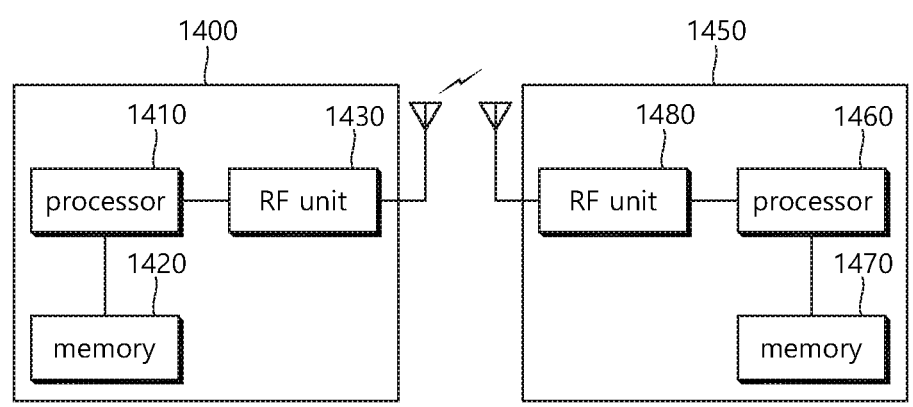
FIG. 14 is a block diagram illustrating a wireless device according to the present embodiment.

FIG. 14 is a block diagram illustrating a wireless device according to the present embodiment.

Referring to FIG. 14, the wireless device is an STA capable of implementing the aforementioned embodiment, and may be an AP or a non-AP STA. The wireless device may correspond to the aforementioned user, or may correspond to a transmitting device for transmitting a signal to the user.

The AP 1400 includes a processor 1410, a memory 1420, and a radio frequency (RF) unit 1430.

The RF unit 1430 may be coupled to the processor 1410 to transmit/receive a radio signal.

The processor 1410 may implement the functions, procedures, and/or methods proposed in the present specification. For example, the processor 1410 may perform an operation according to the aforementioned embodiment. That is, the processor 1410 may perform an operation of the AP among operations disclosed in the embodiment of the FIG. 1 to FIG. 13.

The non-AP STA 1450 includes a processor 1460, a memory 1470, and an RF unit 1480.

The RF unit 1480 may be coupled to the processor 1460 to transmit/receive a radio signal.

The processor 1460 may implement the functions, procedures, and/or methods proposed in the present embodiment. For example, the processor 1460 may be implemented to perform an operation of the non-AP STA according to the aforementioned embodiment. The processor may perform an operation of the non-AP STA in the embodiment of the FIG. 1 to FIG. 13.

The processors 1410 and 1460 may include an application-specific integrated circuit (ASIC), a separate chipset, a logic circuit, a data processing unit, and/or a converter for mutually converting a baseband signal and a radio signal. The memories 1420 and 1470 may include a read-only memory (ROM), a random access memory (RAM), a flash memory, a memory card, a storage medium, and/or other equivalent storage devices. The RF units 1430 and 1480 may include one or more antennas for transmitting and/or receiving the radio signal.

When the embodiment of the present embodiment is implemented in software, the aforementioned methods can be implemented with a module (i.e., process, function, etc.) for performing the aforementioned functions. The module may be stored in the memories 1420 and 1470, and may be performed by the processors 1410 and 1460. The memories 1420 and 1470 may be located inside or outside the processors 1410 and 1460, and may be coupled to the processors 1410 and 1460 by using various well-known means.

The present specification proposes a signaling scheme capable of accurately indicating various types of resource units transmitted at an 80 MHz band.

What is claimed is:

1. A method for a wireless local area network (LAN) system, the method comprising:
    configuring a physical layer protocol data unit (PPDU) comprising a first resource unit (RU) area to be transmitted on a first frequency band, a second RU area to be transmitted on a second frequency band contiguous to the first frequency band, a center RU area to be transmitted on a center frequency band contiguous to the second frequency band, a third RU area corresponding to a third frequency band continued from the center frequency band, and a fourth RU area to be transmitted on a fourth frequency band contiguous to the third frequency band,
    wherein the PPDU further comprises a signal-A (SIG-A) field including a first sub-field for a duration of transmission opportunity (TXOP) used for network allocation vector (NAV) setting and a second sub-field related to whether the PPDU is used for downlink transmission or uplink transmission
    wherein the PPDU further comprises a first signal-B (SIG-B) field related to the first frequency band, a second SIG-B field related to the second frequency band, a third SIG-B field related to the third frequency band, and a fourth SIG-B field related to the fourth frequency band,
    wherein the SIG-A field and the first to fourth SIG-B fields are configured based on a first subcarrier spacing of 312.5 kHz,
    wherein the first to fourth RU areas and the center RU area are configured based on a second subcarrier spacing of 78.125 kHz,
    wherein the first SIG B field comprises a first common control field including first RU allocation information for the first, center, and third RU areas,
    wherein the first RU allocation information for the first RU area has a length of 8 bits, the first RU allocation information for the third RU area has a length of 8 bits, and the first RU allocation information for the center RU area has a length of 1 bit,
    wherein the second SIG-B field comprises a second common control field including second RU allocation information for the second, center, and fourth RU areas,
    wherein the second RU allocation information for the second first RU area has a length of 8 bits, the second RU allocation information for the fourth RU area has a length of 8 bits, and the second RU allocation information for the center RU area has a length of 1 bit,
    wherein the first SIG-B field is duplicated in the third SIG B field, and
    wherein the second SIG-B field is duplicated in the fourth SIG B field; and
    transmitting the PPDU.

2. The method of claim 1, wherein the center frequency band comprises a frequency band used for a direct current (DC) subcarrier.

3. The method of claim 1, wherein each of the first to fourth RU areas includes 242 subcarriers.

4. A transmitting apparatus for a wireless local area network (LAN) system, the apparatus comprising:
    a transceiver for transmitting and receiving a radio signal; and
    a processor for controlling the transceiver,
    wherein the processor:
        configures a physical layer protocol data unit (PPDU) comprising a first resource unit (RU) area to be transmitted on a first frequency band, a second RU area to be transmitted on a second frequency band contiguous to the first frequency band, a center RU area to be transmitted on a center frequency band contiguous to the second frequency band, a third RU area to be transmitted on a third frequency band contiguous to the center frequency band, and a fourth RU area to be transmitted on a fourth frequency band contiguous to the third frequency band, and
        controls the transceiver to transmit the PPDU,
    wherein the PPDU further comprises a signal-A (SIG-A) field including a first sub-field for a duration of transmission opportunity (TXOP) used for network allocation vector (NAV) setting and a second sub-field related to whether the PPDU is used for downlink transmission or uplink transmission,
    wherein the PPDU further comprises a first signal-B (SIG-B) field related to the first frequency band, a second SIG-B field related to the second frequency band, a third SIG-B field related to the third frequency band, and a fourth SIG-B field related to the fourth frequency band, wherein the SIG-A field and the first to fourth SIG-B fields are configured based on a first subcarrier spacing of 312.5 kHz, wherein the first to fourth RU areas and the center RU area are configured based on a second subcarrier spacing of 78.125 kHz, wherein the first SIG-B field comprises a first common control field including first RU allocation information for the first, center, and third RU areas, wherein the first RU allocation information for the first RU area has a length of 8 bits, the first RU allocation information for the third RU area has a length of 8 bits, and the first RU allocation information for the center RU area has a length of 1 bit, wherein the second SIG-B field comprises a second common control field including second RU allocation information for the second, center, and fourth RU areas, wherein the second RU allocation information for the second first RU area has a length of 8 bits, the second RU allocation information for the fourth RU area has a length of 8 bits, and the second RU allocation information for the center RU area has a length of 1 bit, wherein the first SIG-B field is duplicated in the third SIG-B field, and wherein the second SIG-B field is duplicated in the fourth SIG-B field.

5. The apparatus of claim 4, wherein the center frequency band comprises a frequency band used for a direct current (DC) subcarrier.

6. The apparatus of claim 4, wherein each of the first to fourth RU areas includes 242 subcarriers.

7. The method of claim 1, wherein the PPDU is an 80 MHz PPDU.

8. The method of claim 7, wherein each of the first to fourth signal fields occupies a 20 MHz band.

9. The apparatus of claim 4, wherein the PPDU is an 80 MHz PPDU.

10. The apparatus of claim 9, wherein each of the first to fourth signal fields occupies a 20 MHz band.

11. A receiving apparatus for a wireless local area network (LAN) system, the apparatus comprising:
a transceiver configured for transmitting and receiving a radio signal; and
a processor configured for controlling the transceiver,
wherein the processor decodes a physical layer protocol data unit (PPDU) comprising a first resource unit (RU) area received on a first frequency band, a second RU area received on a second frequency band being contiguous to the first frequency band, a center RU area received on a center frequency band being contiguous to the second frequency band, a third RU area received on a third frequency band being contiguous to the center frequency band, and a fourth RU area received on a fourth frequency band being contiguous to the third frequency band, wherein the PPDU further comprises a signal-A (SIG-A) field including a first sub-field for a duration of transmission opportunity (TXOP) used for network allocation vector (NAV) setting and a second sub-field related to whether the PPDU is used for downlink transmission or uplink transmission, wherein the PPDU further comprises a first signal-B (SIG-B) field related to the first frequency band, a second SIG-B field related to the second frequency band, a third SIG-B field related to the third frequency band, and a fourth SIG-B field related to the fourth frequency band, wherein the SIG-A field and the first to fourth SIG-B fields are configured based on a first subcarrier spacing of 312.5 kHz, wherein the first to fourth RU areas and the center RU area are configured based on a second subcarrier spacing of 78.125 kHz, wherein the first SIG-B field comprises a first common control field including first RU allocation information for the first, center, and third RU areas, wherein the first RU allocation information for the first RU area has a length of 8 bits, the first RU allocation information for the third RU area has a length of 8 bits, and the first RU allocation information for the center RU area has a length of 1 bit, wherein the second SIG-B field comprises a second common control field including second RU allocation information for the second, center, and fourth RU areas, wherein the second RU allocation information for the second first RU area has a length of 8 bits, the second RU allocation information for the fourth RU area has a length of 8 bits, and the second RU allocation information for the center RU area has a length of 1 bit, wherein the first SIG-B field is duplicated in the third SIG-B field, and wherein the second SIG-B field is duplicated in the fourth SIG-B field.

12. The apparatus of claim 11, wherein the PPDU is an 80 MHz PPDU.

13. The apparatus of claim 12, wherein each of the first to fourth signal fields occupies a 20 MHz band.

14. The apparatus of claim 11, wherein the center frequency band comprises a frequency band used for a direct current (DC) subcarrier.

15. The apparatus of claim 11, wherein each of the first to fourth RU areas includes 242 subcarriers.

* * * * *